United States Patent [19]

Hitzman

[11] Patent Number: 5,069,787

[45] Date of Patent: Dec. 3, 1991

[54] METHOD AND APPARATUS FOR REMOVING CYANIDE FROM A FLUID

[75] Inventor: Donald O. Hitzman, Bartlesville, Okla.

[73] Assignee: Geo-Microbial Technologies, Inc., Ochelata, Okla.

[21] Appl. No.: 620,635

[22] Filed: Dec. 3, 1990

Related U.S. Application Data

[62] Division of Ser. No. 483,508, Feb. 23, 1990, Pat. No. 4,975,193.

[51] Int. Cl.$^5$ ............................................. C02F 1/72
[52] U.S. Cl. ......................... 210/259; 210/610; 210/631; 210/759; 210/904; 422/207
[58] Field of Search .............. 210/601, 610, 631, 759, 210/758, 904, 259; 204/DIG. 13; 423/DIG. 17, DIG. 20, 29, 30, 31, 584, 591; 75/99; 422/198, 202, 203, 204, 205, 207

[56] References Cited

U.S. PATENT DOCUMENTS

| | | | |
|---|---|---|---|
| 3,756,947 | 9/1973 | Fujii et al. | 210/904 |
| 4,440,644 | 4/1984 | Mudder et al. | 210/904 |
| 4,510,057 | 4/1985 | Rowe et al. | 210/904 |
| 4,537,682 | 8/1985 | Wong-Chong | 210/903 |
| 4,540,052 | 9/1985 | Hitzman | 210/764 |
| 4,975,193 | 12/1990 | Hitzman | 210/631 |

Primary Examiner—Stanley S. Silverman
Assistant Examiner—Neil M. McCarthy
Attorney, Agent, or Firm—Foley & Lardner

[57] ABSTRACT

A system for removing cyanide and related species from a cyanide-containing waste fluid, for example, of the sort generated by mining operations, includes means for generating hydrogen peroxide by the burning of a fuel and the quenching of that burning with the waste fluid. At least a portion of the cyanide content of the waste fluid is eliminated by oxidation with the hydrogen peroxide, and the quenching can also provide organic material to serve as a carbon source for microbes which degrade residual cyanide in the treated waste stream.

4 Claims, 2 Drawing Sheets

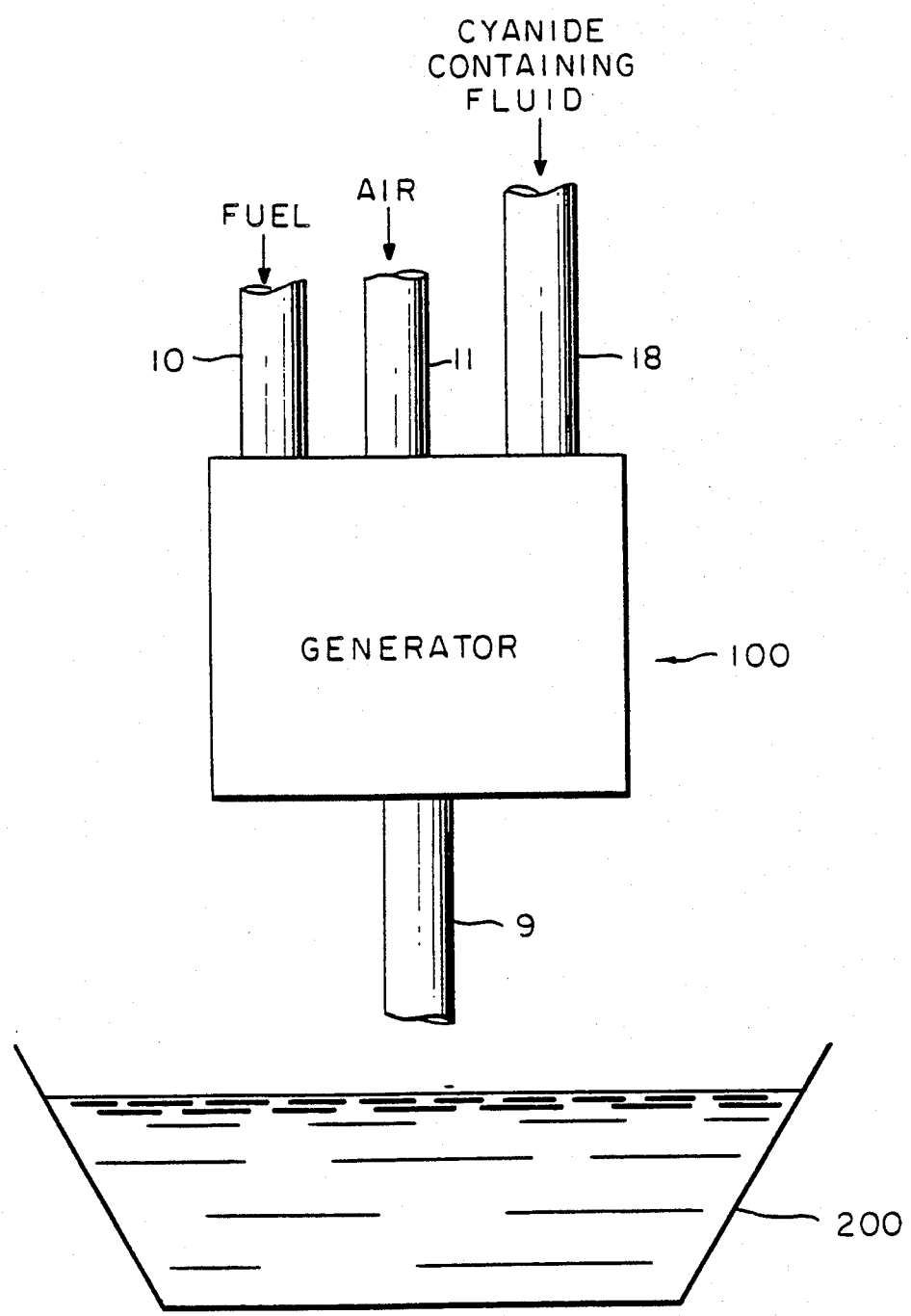

METHOD AND APPARATUS FOR REMOVING CYANIDE FROM A FLUID

BACKGROUND OF THE INVENTION

The present invention relates to the removal of cyanide from a fluid using hydrogen peroxide generated by combustion. The invention has particular applicability to the removal of cyanide from waste water generated during mining operations.

Mining operations, including gold mining, and other metal-extraction procedures can produce a large quantity of waste water containing cyanide. Since cyanide-bearing waste is too difficult to transport safely, the cyanide must be removed or detoxified in the vicinity of the mining site. A conventional method for removing cyanide from waste liquids is to oxidize the cyanide using hydrogen peroxide, as disclosed, for example, in U.S. Pat. Nos. 3,970,554 and 4,416,786. Residual amounts of cyanide remaining in a waste liquid thus treated can also be removed by bringing indigenous, cyanidemetabolizing microbes into contact with the waste fluid.

Unfortunately, hydrogen peroxide is not only expensive but also bulky, necessitating large tanks for its storage. Moreover, mining operations are frequently conducted at remote sites, to which transporting hydrogen peroxide is costly. In addition, the effectiveness of cyanide-removing microbes, upon which conventional mining operations heavily rely, is hampered, especially in colder environments, by a paucity of organic material which the microbes can use as carbon sources.

Accordingly, there is a need for more effective methods and systems for removing cyanide from waste fluid, particularly in the context of mining operations.

SUMMARY OF THE INVENTION

It is therefore an object of the present invention to provide a system that removes cyanide from waste fluid in an efficient manner.

Another object of the invention is to provide a cyanide-removal system that does not require storage of bulky reagents.

Another object of the invention is to provide a system for removing cyanide that also yields organic material capable of serving as a carbon source for cyanide-metabolizing microbes.

Yet another object of the present invention is to provide a cyanide-removal system that is practicable for use at remote mining locations.

In accomplishing the foregoing objects, there has been provided, according to one aspect of the present invention, a method for treating a fluid stream, comprising the steps of (a) providing a fluid stream that contains cyanide species and (b) burning a fuel and quenching the burning with the fluid stream to produce hydrogen peroxide, such that at least a portion of the cyanide species are oxidized by the hydrogen peroxide. In a preferred embodiment, the method further comprises a step (c), after step (b), of bringing the fluid stream into contact with microbes that metabolize a cyanide species. In another preferred embodiment, the aforementioned microbes utilize partial oxidation products produced by the burning as a carbon source such that, during step (c), degradation of cyanide species in the fluid stream by the microbes is facilitated.

In accordance with another aspect of the present invention, a system is provided that comprises (a) a fluid stream that contains a cyanide species; (b) apparatus for producing hydrogen peroxide by burning a fuel and quenching the burning with a liquid to produce hydrogen peroxide; and (c) means for introducing the fluid stream into the apparatus such that the fluid stream quenches the burning to produce hydrogen peroxide which oxidizes at least some of the cyanide species in the fluid stream, yielding an effluent. In a preferred embodiment, the apparatus produces partial oxidation products, in addition to hydrogen peroxide, via the burning mentioned above.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention is described below with reference to the accompanying drawings in which:

FIG. 2 illustrates a preferred embodiment of the present invention.

DETAILED DESCRIPTION OF THE PREFERRED EMBODIMENTS

Figure 1:
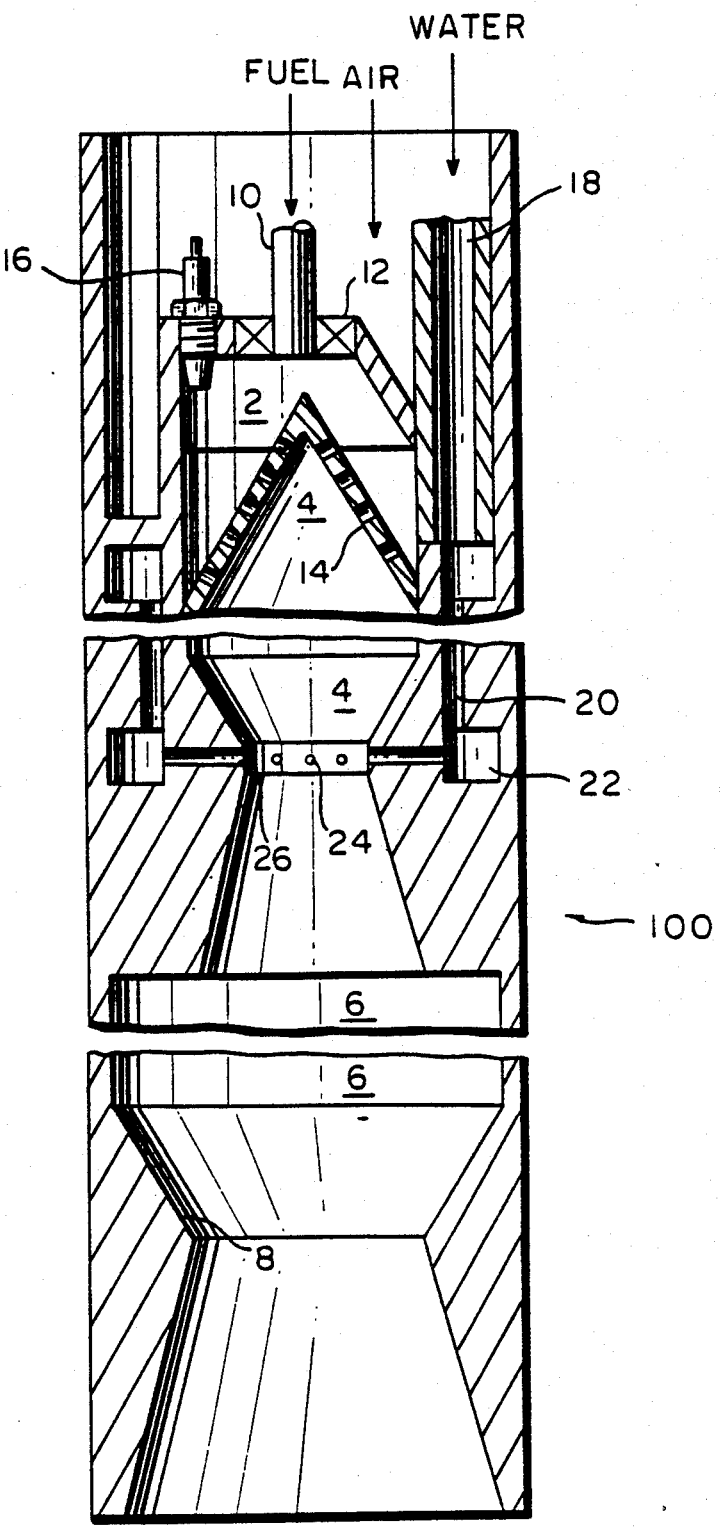
FIG. 1 illustrates a generator which can be used according to the present invention.

It has been discovered that an aqueous fluid stream which is "cyanide-containing"—that is, a waste stream containing cyanide and related species like cyanate, thiocyanate and cyanogen (collectively "cyanide species")—can be treated to remove cyanide values by using the fluid stream to quench the burning of a fuel. During such a quenching, hydrogen peroxide is generated that oxidizes cyanide and related species present in the fluid stream. The quenching also produce an organic material, in the form of partial combustion products other than hydrogen peroxide, which enters the fluid stream to provide a carbon source for microbes which can be enlisted downstream to metabolize any residual cyanide species not oxidized by the primary hydrogen-peroxide treatment.

Suitable apparatus for conducting a quenching operation within the present invention is disclosed in U.S. Pat. No. 4,540,052 ("'052 patent"), the contents of which are hereby incorporated by reference. The '052 patent describes a generator that employs water as the quench fluid in the context of producing a biocide which contains partial oxidation products, including hydrogen peroxide.

In the present invention, on the other hand, a partial oxidation products which are generated by burning a fuel and then quenching the burning are employed to effect a hydrogen peroxide-based oxidation of cyanide species present in the quenching-fluid (waste) stream. In contrast to the biocidal utility identified in the '052 patent, moreover, the partial oxidation products can optionally be exploited, pursuant to the present invention, to enhance microbial breakdown of residual cyanide.

FIG. 1 depicts the basic structure of a generator 100 suitably used according to the present invention. The generator includes a mixing zone 2, a combustion zone 4, a quench or cooling chamber 6, and a discharge nozzle 8. Fuel is introduced through the fuel introduction pipe 10 as a generally axial stream into mixing zone 2. Air is introduced into the mixing zone 2 through swirl structure 12. The swirl structure 12 is one of several well-known structures, such as an annular ring with fins at appropriate angles, suitable for creating an annular stream of air. The fuel and air are partially mixed in mixing zone 2 and are then passed through a barrier 14. The barrier 14 is a perforated grid, which together with the axial introduction of fuel and the annular introduction of air creates an annularly stratified body of fluids which is fuel rich along the axis of combustion zone 4 and fuel lean adjacent to the walls of combustion zone 4.

The generator of FIG. 1 can be fueled with any conventional gaseous fuel like natural gas. Ignition of the fuel and air mixture is effected by a spark plug 16. Quench fluid is introduced through line 18, passes through annular chamber 20 in indirect heat exchange with the combustion zone, and then enters annular plenum 22. The fluid is finally introduced into the flame front through a plurality of annularly spaced apertures 24.

The combustion occurring in the generator produces partial oxidation products The mix of oxygen-containing oxidation products can be adjusted by controlling the flow rates of fuel, air and quenching fluid. Severe (low oxygen) conditions favor the production of hydrogen peroxide, while milder conditions favor production of alcohols, peroxides, ketones, ethers, esters and acids. Intermediate conditions favor the production of aldehydes. It is preferable that conditions be controlled to maximize the amount of hydrogen peroxide introduced into the quenching, cyanide-containing stream.

By way of illustration, partial oxidation of propane with air in a high intensity combustor of the above-described design, utilizing water as a quench fluid under conditions maximizing the yield of hydrogen peroxide, involves the following reactions:

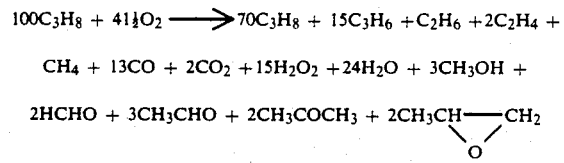

$$100C_3H_8 + 41\tfrac{1}{2}O_2 \longrightarrow 70C_3H_8 + 15C_3H_6 + C_2H_6 + 2C_2H_4 +$$

$$CH_4 + 13CO + 2CO_2 + 15H_2O_2 + 24H_2O + 3CH_3OH +$$

$$2HCHO + 3CH_3CHO + 2CH_3COCH_3 + 2CH_3CH\underset{O}{\overset{}{-\!\!\!-\!\!\!-}}CH_2$$

Aside from unreacted propane and air, along with nitrogen, carbon monoxide, carbon dioxide and other hydrocarbon products, combustion pursuant to the present invention would be expected to provide the following partial oxidation products.

TABLE 1

| Moles | Component | Wt. % | Vol. % |
|---|---|---|---|
| 15 | Hydrogen Peroxide | 51.0 | 36.9 |
| 3 | Methyl Alcohol | 6.6 | 8.7 |
| 2 | Formaldehyde | 6.0 | 7.6 |
| 3 | Acetaldehyde | 13.2 | 17.5 |
| 2 | Acetone | 11.6 | 15.2 |
| 2 | Propylene Oxide | 11.6 | 14.1 |
| 27 | | 100.0 | 100.0 |

FIG. 2 depicts a preferred embodiment of the instant invention, wherein a generator 100 (see FIG. 1) produces hydrogen peroxide for oxidizing cyanide species in a cyanide-containing fluid stream, while generating organic material optionally useful to enhance downstream microbial action on residual cyanide content. Cyanide-containing fluid, supplied to the generator 100 via fluid path 18, is preferably waste fluid from a gold-extraction or other mining operation. Air is supplied to the generator 100 via fluid path 11 and fuel is supplied to the generator 100 via fluid path 10. The fuel and air undergo combustion which is quenched by the cyanide-containing fluid to produce hydrogen peroxide and organic material. In order to oxidize the cyanide, the fuel, air, and water flow rates are adjusted to maximize the production of hydrogen peroxide. The hydrogen peroxide and the organic material are mixed with the cyanide-containing fluid stream in the generator 100 during and immediately after combustion. The discharge of the generator is directed to a holding volume 200 via fluid path 9.

The holding volume 200 can be a pond or pit which contains microbes that metabolize residual cyanide. The nature of indigenous cyanide-removing microbes varies depending on locale, but microbes capable of effecting the breakdown of cyanide species are found in virtually all habitats. Accordingly, organic materials can be produced, according to the present invention, that can be used to enhance growth (and, hence, the effectiveness) of cyanide-degrading microbes in holding ponds in diverse locations where metal extraction is effected.

What is claimed is:

1. Apparatus for removing cyanide from fluid with the aid of cyanide-metabolizing microbes, comprising (a) a conduit for introducing fuel into a mixing zone; (b) means for delivering an annular stream of air to said mixing zone such that fuel and air are mixed in said mixing zone; (c) a combustion zone which communicates with said mixing zone through a perforated barrier to receive an air/fuel mixture; (d) means for effecting combustion of an air/fuel mixture in said combustion zone; (e) means for providing a quench fluid stream to quench said combustion comprising an annular chamber in indirect heat exchange with said combustion zone, said annular chamber communicating with said combustion zone through a plurality of annularly spaced apertures through which said quench fluid is introduced into a flame front in said combustion zone; said quench fluid stream containing a cyanide species, such that an effluent stream is produced which comprises hydrogen peroxide which oxidizes at least a portion of said cyanide species and organic material (f) means for conveying said effluent stream to a repository for cyanide-metabolizing microbes; and (g) a repository that contains cyanide-metabolizing microbes which degrade at least a portion of said cyanide species in said effluent stream, said microbes capable of using said organic material as a carbon source.

2. A system as set forth in claim 1, wherein said fluid stream is a waste stream from a metal extraction.

3. A system as set forth in claim 1, wherein said apparatus produces partial oxidation products, in addition to hydrogen peroxide, by said burning.

4. A system as set forth in claim 1, wherein said fluid stream is a waste stream from a metal extraction.

* * * * *